N. P. STEVENS.
Machine for Dressing Valve Seats, &c.

No. 167,038.  Patented Aug. 24, 1875.

Witnesses
S. W. Piper
L. N. Holler

Nathan P. Stevens.
by his attorney

UNITED STATES PATENT OFFICE.

NATHAN P. STEVENS, OF HOPKINTON, NEW HAMPSHIRE.

IMPROVEMENT IN MACHINES FOR DRESSING VALVE-SEATS, &c.

Specification forming part of Letters Patent No. 167,038, dated August 24, 1875; application filed July 3, 1875.

*To all whom it may concern:*

Be it known that I, NATHAN P. STEVENS, of Hopkinton, of the county of Merrimack and State of New Hampshire, have made a new and useful invention, having reference to Machinery for Dressing or Facing Valve-Seats, Cylinder Ends, or Heads, &c.; and do hereby declare the same to be fully described in the following specification and represented in the accompanying drawings, of which—

Figure 1:
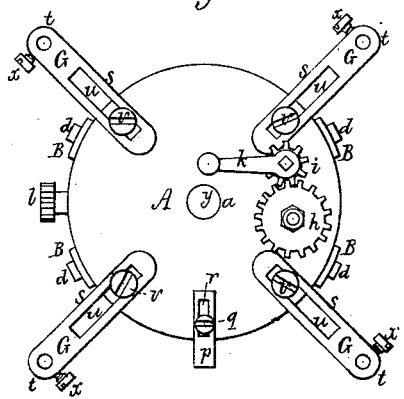
Figure 2:
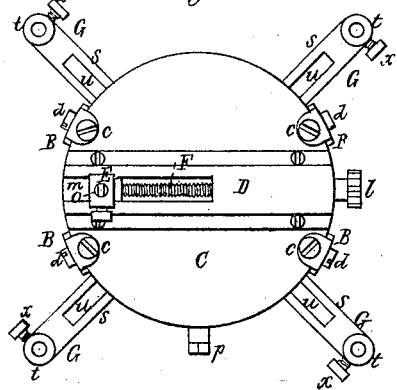
Figure 3:
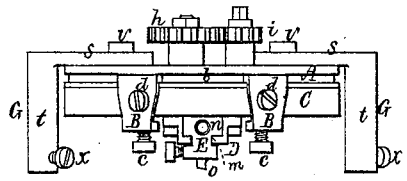
Figure 4:
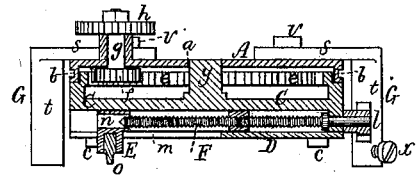

Figure 1 denotes a top view, Fig. 2 a bottom view, Fig. 3 a side elevation, and Fig. 4 a transverse section, of a machine embodying my invention, the plane of section being through the feeding-screw longitudinally thereof.

On January 23, 1872, Letters Patent of the United States, No. 122,921, were granted to me for a machine for facing the end of a tube or cylinder. My present machine is intended not only for such a purpose, but to accomplish the facing of a steam-engine cylinder-head or a valve-seat, or various other mechanical articles.

The new machine embodies the essential elements of the patented machine, with the exception that, instead of the screws for holding or fixing the machine in a tube or cylinder, I use a series of slotted and tubular legs, as hereinafter explained, held to the tool-wheel supporter by clamp-screws.

Furthermore, instead of the tool-carrier and its guide being arranged wholly on one side of the center of the face of the tool-wheel, I now have the guide applied so as to extend across the wheel-face diametrically or in opposite directions from the center of the wheel, and constructed so as to allow the tool to be moved from the center toward and beyond the circumference of the tool-wheel, whereby by means of the machine a surface may be dressed or faced from its center to its periphery or perimeter. I also provide the tool-wheel supporter with a groove in and around its periphery, and with a series of adjustable gibs applied to it and the tool-wheel, all as described and shown.

In the drawings the tool-wheel supporter is shown at A as consisting of a disk having a circular hole, $a$, at its center to receive a journal, $y$, from the tool-wheel. It also has a groove, $b$, in and around its periphery, such groove being to receive the series of adjustable gibs B B B B, which, arranged as represented, extend into the groove and down across the periphery of the tool-wheel C and project underneath the latter. In the part of each gib extending underneath the tool-wheel there is a screw, $c$, which, screwed into and through such part, abuts against the lower face of the tool-wheel, and serves with the gib to force the said wheel up to its supporter. Each gib is held to the tool-wheel by a set-screw, $d$, which goes through the gib and screws into the tool-wheel, the hole in the gib to receive the shank of the screw being sufficiently large to allow the gib, through the action of its lower or adjusting screw, to draw the wheel and its supporter into contact from time to time as their abutting surfaces may become worn. The tool-wheel C, which has the form of a circular box, has gear-teeth $e$ around its inner periphery to engage with a gear, $f$, fixed on a short shaft, $g$. This shaft, supported in the tool-wheel supporter A, is provided with another gear, $h$, to engage with a driving-pinion, $i$, suitably pivoted to the said supporter and provided with a crank, K. Extending diametrically across the lower face of the tool-wheel is the cutter-carrier supporter D, within which the cutter-carrier E is placed and applied so as to be capable of being moved rectilinearly by a feed-screw, F, arranged in the said part D and E in manner as represented, and provided, where projecting out of the part D, with a toothed wheel, $l$. The tool-carrier supporter D is slotted lengthwise, as shown at $m$, to receive the part $n$ of the tool-carrier, which extends through and beyond the slot, and is socketed to receive and support the cutter or tool $o$. An adjustable tooth, $p$, formed as shown, projects from the supporter A, to which it is fastened by a clamp-screw, $q$, going through a slot, $r$, in the shank of the tooth. Furthermore, there extends from the tool-wheel supporter A a series of slotted legs, G G G G, each of which is composed of a straight bar, $s$, and a tube, $t$, the latter being arranged at a right angle to the former. The bar $s$ is slotted, as shown at $u$, to receive a clamp-screw, $v$, by which the leg is held to the part A. The tube $t$ has its bore prolonged through the bar $s$, such tube near its lower end being furnished with a set-screw, $x$, screwed into it laterally. By means of the adjustable legs and their clamp-screws the machine may be readily fastened to the projecting screws of a steam-engine cylinder, at one end of it, or to a cylinder-head, or to a valve-seat, by means of bolts run through its holes and going up into the tubular parts of the legs, which having been accomplished, the operation of dressing or facing the said cylinder-head or valve-seat, as the case may be, may be carried on by laying hold of and revolving the crank K in the right direction. While said crank may be so moved the tool-wheel will be revolved, and by means of it the tool or cutter will be carried around with it, such tool being intermittently fed forward from the center toward its circumference of the wheel. Every time the toothed wheel $l$ passes the tooth $p$, such wheel will be partially revolved, and will in like manner revolve the feed-screw, whereby the cutter-carriers will be advanced in the part D.

I claim—

1. In combination with the tool-wheel C, and its supporter A, provided with mechanism for revolving the said tool-wheel, the series of slotted adjustable legs G, substantially as described, held to the said supporter by clamp-screws $v$ going through the slots of the said legs.

2. An adjustable leg, G, composed of the slotted bar $s$, the tube $t$, and set-screw $x$, as explained.

3. In combination with the tool-wheel C, and tool-carrier E, the supporter D extended diametrically across the center of the tool-wheel, and constructed to enable the tool to be moved from under the center of the wheel outwardly to or beyond its circumference, all as set forth.

4. The combination of the series of adjustable gibs B, with the tool-wheel C, and with its supporter A, grooved in and around its circumference, as specified.

NATHAN P. STEVENS.

Witnesses:
   R. H. EDDY,
   J. R. SNOW.